(12) United States Patent
Muthukaruppan et al.

(10) Patent No.: US 10,895,184 B2
(45) Date of Patent: Jan. 19, 2021

(54) METHOD FOR MONITORING AN AMMONIA SLIP CATALYTIC CONVERTER

(71) Applicant: FEV Europe GmbH, Aachen (DE)

(72) Inventors: Arun Palaniappan Muthukaruppan, Aachen (DE); Michael Rupp, Nettersheim (DE); Sudarshan Patil, Alsdorf (DE); Karthik Barahagar Gururaja, Aachen (DE)

(73) Assignee: FEV Europe GmbH, Aachen (DE)

( * ) Notice: Subject to any disclaimer, the term of this patent is extended or adjusted under 35 U.S.C. 154(b) by 0 days.

(21) Appl. No.: 16/285,443

(22) Filed: Feb. 26, 2019

(65) Prior Publication Data

US 2019/0264593 A1 Aug. 29, 2019

(30) Foreign Application Priority Data

Feb. 27, 2018 (DE) .......................... 10 2018 104 385

(51) Int. Cl.
*F01N 3/10* (2006.01)
*F01N 13/00* (2010.01)
(Continued)

(52) U.S. Cl.
CPC ............. *F01N 3/108* (2013.01); *F01N 3/035* (2013.01); *F01N 3/106* (2013.01); *F01N 3/208* (2013.01); *F01N 3/2066* (2013.01); *F01N 11/00* (2013.01); *F01N 13/009* (2014.06); *F01N 2430/06* (2013.01); *F01N 2550/02* (2013.01); *F01N 2560/021* (2013.01); *F01N 2560/026* (2013.01);
(Continued)

(58) Field of Classification Search
CPC .... F01N 11/00; F01N 2560/026; F01N 3/106; F01N 2560/021; F01N 3/2066; F01N 3/208; F01N 13/009; F01N 2430/06; F01N 2550/02; F01N 3/108; F01N 2610/02; F01N 3/035; Y02T 10/24; Y02T 10/47
See application file for complete search history.

(56) References Cited

U.S. PATENT DOCUMENTS

2010/0077739 A1* 4/2010 Rodman ............... F01N 3/2066
60/301
2010/0281853 A1 11/2010 Toshioka et al.
(Continued)

FOREIGN PATENT DOCUMENTS

DE 102012211705 A1 1/2014
DE 02013012575 A1 2/2015

OTHER PUBLICATIONS

German Search Report dated Oct. 23, 2018; German application No. 10 2018 104 385.6.

*Primary Examiner* — Brandon D Lee
(74) *Attorney, Agent, or Firm* — Dinsmore & Shohl LLP

(57) ABSTRACT

The invention relates to a method for monitoring an ammonia slip catalytic converter which is arranged in an exhaust gas after-treatment device of an internal combustion engine, downstream of a catalytic converter arrangement, wherein the method comprises the steps of measuring a nitrogen oxide content in the exhaust gas by means of a sensor upstream of the ammonia slip catalytic converter, detecting a sensor signal of an ammonia-cross-sensitive nitrogen oxide sensor which is arranged downstream of the ammonia slip catalytic converter, and checking whether the ammonia-cross-sensitive nitrogen oxide sensor measures a higher value than the sensor.

5 Claims, 3 Drawing Sheets

(51) Int. Cl.
*F01N 3/035* (2006.01)
*F01N 3/20* (2006.01)
*F01N 11/00* (2006.01)

(52) U.S. Cl.
CPC .......... *F01N 2610/02* (2013.01); *Y02T 10/12* (2013.01); *Y02T 10/40* (2013.01)

(56) References Cited

U.S. PATENT DOCUMENTS

| | | |
|---|---|---|
| 2010/0319316 A1 | 12/2010 | Kasahara |
| 2012/0137657 A1* | 6/2012 | Dahl ................. F01N 3/103 60/274 |
| 2012/0222401 A1* | 9/2012 | Scherer ............. F01N 3/0842 60/274 |

* cited by examiner

_(1)_

METHOD FOR MONITORING AN AMMONIA SLIP CATALYTIC CONVERTER

CROSS-REFERENCE TO RELATED APPLICATIONS

This Application claims priority from Application 102018104385.6 filed on Feb. 27, 2018 in Germany.

FIELD OF THE INVENTION

The invention relates to a method for monitoring an ammonia slip catalytic converter and to a controller for carrying out such a method.

BACKGROUND

DE 10 2012 211 705 A1 discloses a method in which the functional capability of an ammonia-cross-sensitive nitrogen oxide sensor is checked.

SUMMARY

The method according to the invention for monitoring an ammonia slip catalytic converter, which is arranged in an exhaust gas after-treatment device of an internal combustion engine, downstream of a catalytic converter arrangement, comprises the steps of measuring a nitrogen oxide content in the exhaust gas by means of a sensor upstream of the ammonia slip catalytic converter, detecting a sensor signal of an ammonia-cross-sensitive nitrogen oxide sensor which is arranged downstream of the ammonia slip catalytic converter, and checking whether the ammonia-cross-sensitive nitrogen oxide sensor measures a higher value than the sensor.

An ammonia-cross-sensitive nitrogen oxide sensor according to the invention is a sensor which can measure both ammonia and nitrogen oxides, wherein a measured value is the sum of the two measured values, with the result that as a rule it is not possible to make a precise statement with respect to only the quantity of ammonia or with respect to only the quantity of nitrogen oxide.

The ammonia slip catalytic converter is a component which is arranged downstream of the catalytic converter arrangement, in order to convert ammonia slip, i.e. a portion of the ammonia which exits the catalytic converter arrangement in a non-converted state, so that an emission of ammonia to the surroundings meets legal requirements.

Possible advantages of the invention are that in the event of a higher value being measured for the ammonia-cross-sensitive nitrogen oxide sensor than for the sensor, it can be inferred that ammonia is exiting the ammonia slip catalytic converter. As a result it can be detected whether the ammonia slip catalytic converter is operating correctly or is defective. The limiting values for the emission of ammonia which are becoming ever stricter can therefore be complied with better.

The sensor is preferably arranged upstream of the catalytic converter arrangement or downstream of the ammonia injectors. Since there is no ammonia present in the exhaust gas upstream of the catalytic converter arrangement or of the ammonia injectors, an ammonia-cross-sensitive nitrogen oxide sensor can preferably also be used at this location. This has the advantage that the same type of sensor can be used for both sensors, with the result that only one type of sensor has to be kept available. As a result, storage space can be saved and a possible fault source can be eliminated by interchanging the sensors.

In a preferred embodiment of the invention, the checking takes place during an operating phase during which an $NO_x$ raw emission is essentially zero. Alternatively, checking takes place during an operating phase during which a fuel injection rate is zero. Such a state occurs, for example, in an overrun phase in which the internal combustion engine is towed by the motor vehicle. If the ammonia-cross-sensitive nitrogen oxide sensor measures a higher value than the sensor in this phase in which no ammonia injection takes place and no NOx is present, a defect of the ammonia slip catalytic converter can be inferred, since it has to be assumed that ammonia is exiting the ammonia slip catalytic converter. This therefore has the advantage that in this phase it is possible to make a good statement about the operation of the ammonia slip catalytic converter.

In a further preferred embodiment of the invention, the checking takes place during an operating phase during which a current ammonia loading of the catalytic converter arrangement is greater than a necessary ammonia loading. In this phase, ammonia exits the catalytic converter arrangement as slip, with the result that the ammonia loading slowly approximates to the necessary ammonia loading. If a defect is present at the ammonia slip catalytic converter in this phase, the ammonia-cross-sensitive nitrogen oxide sensor would measure a higher value than the sensor particularly in this phase. As a result, particularly in this phase it is possible to make a precise statement about the operation of the ammonia slip catalytic converter.

The controller according to the invention for an exhaust gas after-treatment device having a catalytic converter arrangement, an ammonia slip catalytic converter which is arranged downstream thereof, a sensor and at least one ammonia injector which are arranged upstream of the ammonia slip catalytic converter, and an ammonia-cross-sensitive nitrogen oxide sensor which is arranged downstream of the ammonia slip catalytic converter, is in this case configured to carry out the method according to the invention for monitoring an ammonia slip catalytic converter. The controller has here the advantage that on the basis of the measured values of the ammonia-cross-sensitive nitrogen oxide sensor and of the sensor which are recorded and evaluated according to the method according to the invention it is possible to make a statement as to whether the ammonia slip catalytic converter is functionally capable or defective. As a result, a controller is made available by means of which the legal requirements for the emission of ammonia can be complied with.

DETAILED DESCRIPTION OF THE PREFERRED EMBODIMENTS

Figure 1:
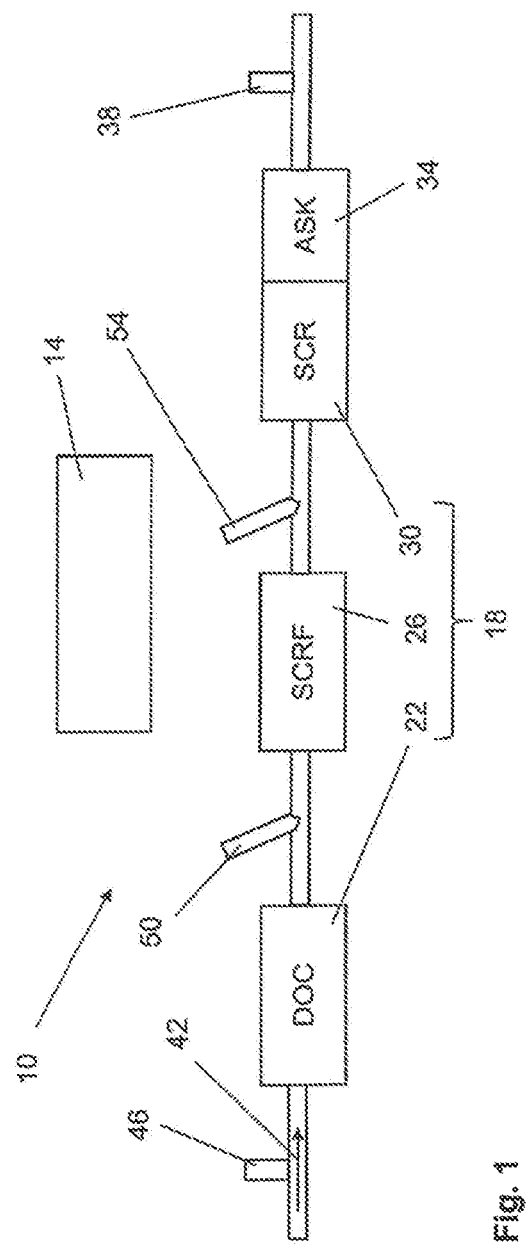
FIG. 1 shows an exemplary embodiment of an exhaust gas after-treatment device of an internal combustion engine having a controller for carrying out the method according to the invention.

FIG. 1 shows an exemplary embodiment of an exhaust gas after-treatment device 10 of an internal combustion engine having a controller 14 for carrying out the method according to the invention. The exhaust gas after-treatment device 10 comprises here a catalytic converter arrangement 18, wherein the catalytic converter arrangement 18 comprises a diesel oxidation catalytic converter (DOC) 22, an SCR-coated particle filter (SCRF) 26 and an SCR catalytic converter (SCR) 30. In addition, the exhaust gas after-treatment device 10 comprises an ammonia slip catalytic converter (ASK) 34 which is arranged downstream of the catalytic converter arrangement 18, an ammonia-cross-sensitive nitrogen oxide sensor 38 which is arranged downstream of the ammonia slip catalytic converter (ASK) 34 in the direction of flow 42, and a sensor 46 which is arranged upstream of the ammonia slip catalytic converter (ASK) 34, in particular upstream of the catalytic converter arrangement 18. A first ammonia injector 50, which injects ammonia into an exhaust train, is arranged upstream of the ammonia slip catalytic converter (ASK) 34 between the diesel oxidation catalytic converter (DOC) 22 and the SCR-coated particle filter (SCRF) 26. A second ammonia injector 54, for injecting ammonia into the exhaust train, is arranged upstream of the ammonia slip catalytic converter (ASK) 34 between the SCR-coated particle filter (SCRF) 26 and the SCR catalytic converter (SCR) 30. In order to carry out the method according to the invention, the control device 14 is connected (connections not shown) to the ammonia cross-sensitive nitrogen oxide sensor 38, the sensor 46, the ammonia injectors 50, 54, the SCR-coated particle filter (SCRF) 26, the SCR catalytic converter (SCR) 30 and the ammonia slip catalytic converter (ASK) 34.

In a further embodiment of the invention, instead of the SCR-coated particle filter (SCRF) 26, a diesel particle filter (not shown) is provided. In addition, in this embodiment, merely a single ammonia injector, which is arranged between the diesel particle filter and the SCR catalytic converter (SCR), can also be arranged.

Figure 2:
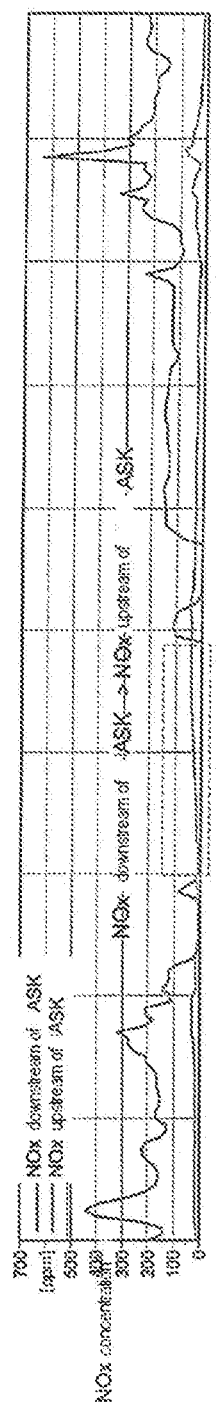
FIG. 2 shows a method for monitoring an ammonia slip catalytic converter according to a first exemplary embodiment according to the invention.

FIG. 2 shows a first inventive exemplary embodiment of the method for monitoring the ammonia slip catalytic converter (ASK) 34. In this figure, the NOx concentration is plotted against the time. In the method according to the invention, firstly a nitrogen oxide content in the exhaust gas upstream of the ammonia slip catalytic converter (ASK) 34 is determined by means of the sensor 46. This value is represented as "NOx upstream of ASK" in the figure. Subsequent to this, a sensor signal of the ammonia-cross-sensitive nitrogen oxide sensor 38 which is arranged downstream of the ammonia slip catalytic converter (ASK) 34 is detected. This value is represented as "NOx downstream of ASK" in the figure. On the basis of both values, it is checked in a subsequent step whether the ammonia-cross-sensitive nitrogen oxide sensor 38 measures a higher value than the sensor 46. The curves which are shown in FIG. 2 show exhaust values at which an ammonia slip catalytic converter (ASK) 34 is absent, i.e. in which the ammonia slip catalytic converter (ASK) 34 is defective. Therefore, if, as shown in FIG. 2, a region (see box composed of dashed lines) in which the determined values downstream of the ammonia slip catalytic converter (ASK) 34 are higher than upstream thereof is therefore produced within a measuring range, it can be assumed that there is a defect of the ammonia slip catalytic converter (ASK) 34. With the method according to the invention it is therefore possible to detect a defect of the ammonia slip catalytic converter (ASK) 34.

In a further exemplary embodiment according to the invention, checking is carried out during an operating phase during which an NOx emission is essentially zero. As a result, the region (see box composed of dashed lines in FIG. 2) in which a defect of the ammonia slip catalytic converter (ASK) 34 can be detected can be determined more precisely. It is therefore no longer necessary to evaluate a large measuring range.

Figure 3:
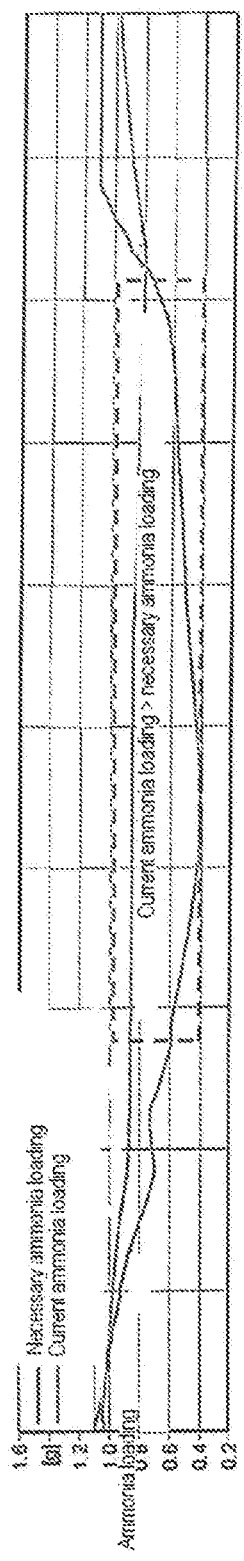
FIG. 3 shows a method for monitoring an ammonia slip catalytic converter according to a second exemplary embodiment according to the invention.

FIG. 3 shows a second inventive exemplary embodiment of the method for monitoring the ammonia slip catalytic converter (ASK) 34. In this figure, the ammonia loading of the catalytic converter arrangement 18 is plotted against the time. In this exemplary embodiment according to the invention, checking takes place during an operating phase during which current ammonia loading of the catalytic converter arrangement 18 is higher than a necessary ammonia loading (see box composed of dashed lines). In this region ammonia is output from the catalytic converter arrangement 18 to an increased degree, with the result that in the event of a defect of the ammonia slip catalytic converter (ASK) 34 this ammonia can be measured by means of the ammonia-cross-sensitive nitrogen oxide sensor 38. As a result, particularly in this region it is possible to detect a defect of the ammonia slip catalytic converter 34 better.

Figure 4:
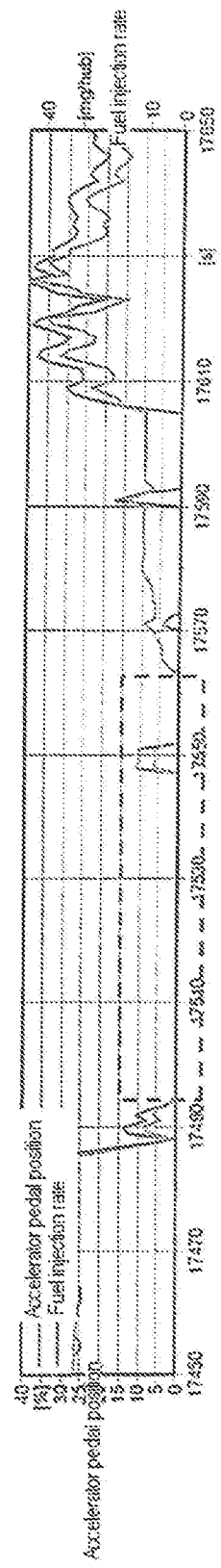
FIG. 4 shows a method for monitoring an ammonia slip catalytic converter according to a third exemplary embodiment according to the invention.

FIG. 4 shows a third exemplary embodiment of the method according to the invention for monitoring the ammonia slip catalytic converter 34. In this figure, a fuel injection rate or an accelerator pedal position is plotted against the time. In this method according to the invention, checking takes place during an operating phase during which a fuel injection rate is zero. During this phase it can be assumed that combustion does not take place, with the result that no nitrogen oxides are output. If the ammonia-cross-sensitive nitrogen oxide sensor 38 measures a higher value than the sensor 46 during such a phase, it can be assumed that the ammonia-cross-sensitive nitrogen oxide sensor 38 merely measures ammonia, with the result that a defect of the ammonia slip catalytic converter (ASK) 34 has to be inferred. Such an operating phase is therefore particularly suitable for being able to detect a defect of the ammonia slip catalytic converter (ASK) 34.

In further exemplary embodiments, the methods for monitoring the ammonia slip catalytic converter 34 which are shown in FIGS. 2 to 4 can be combined with one another. A preferred exemplary embodiment is here the combination of the methods according to FIGS. 2 and 3. A further preferred exemplary embodiment is the combination of the methods according to FIGS. 3 and 4. By means of such combinations, more precise and better determination of the ammonia slip is possible.

Figure 5:
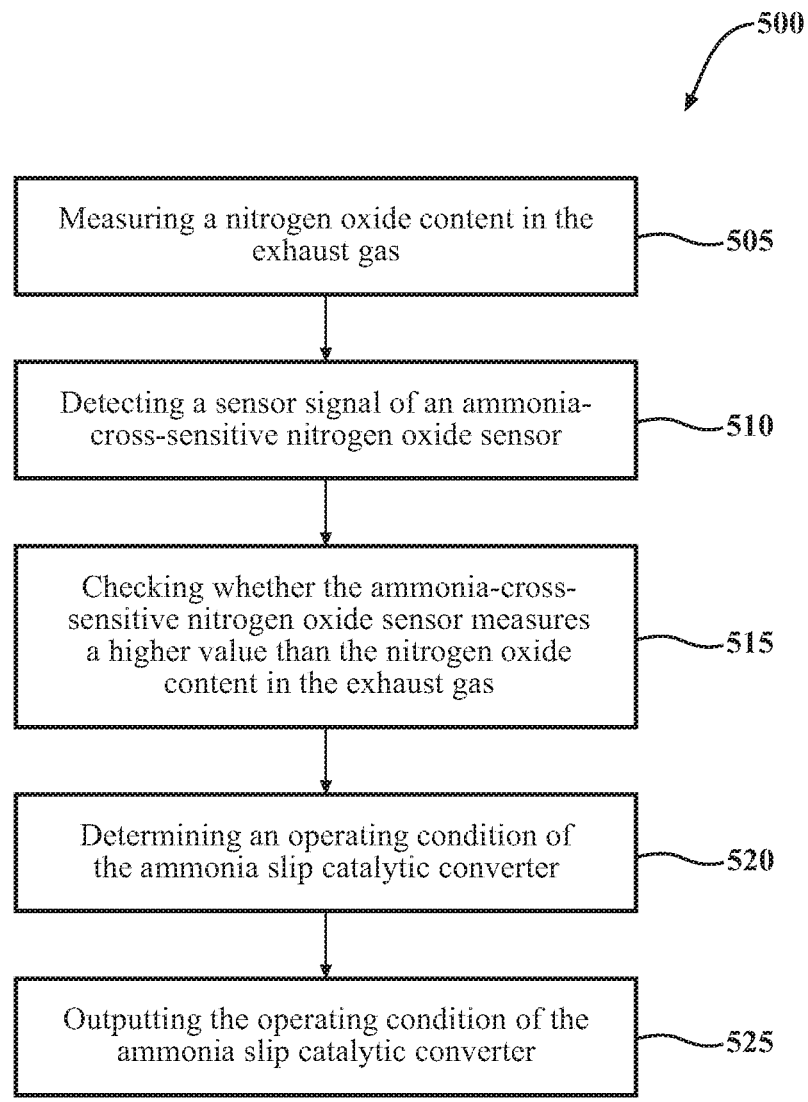
FIG. 5 depicts a flow diagram of an illustrative method of for monitoring an ammonia slip catalytic converter arranged in an exhaust gas after-treatment device of an internal combustion engine, downstream of a catalytic converter arrangement according to embodiments of the invention.

Now referring to FIG. 5, a method 500 for monitoring an ammonia slip catalytic converter arranged in an exhaust gas after-treatment device of an internal combustion engine, downstream of a catalytic converter arrangement is provided. The method 500 includes the steps: measuring, by a first sensor, a nitrogen oxide content in the exhaust gas, at step 505. The measuring is upstream of the ammonia slip catalytic converter, wherein the first sensor is positioned upstream of the catalytic converter arrangement and is configured to detect the nitrogen oxide content in the exhaust gas prior to the catalytic converter arrangement. At step 510, detecting, by a controller, a sensor signal of an ammonia-cross-sensitive nitrogen oxide sensor. The ammonia-cross-sensitive nitrogen oxide sensor is arranged downstream of the ammoma slip catalytic converter. At step 515, checking, by the controller, whether the ammonia-cross-sensitive nitrogen oxide sensor measures a higher value than the nitrogen oxide content in the exhaust gas measured by the first sensor. At step 520, determining, by the controller, an operating condition of the ammonia slip catalytic converter. The operating condition is based on whether the ammonia-cross-sensitive nitrogen oxide sensor measures a higher value than the first sensor. At step 525, outputting, by the controller, the operating condition of the ammonia slip catalytic converter. The operating condition is to whether the ammonia slip catalytic converter is functionally capable or defective.

The invention claimed is:

1. A method for monitoring an ammonia slip catalytic converter arranged in an exhaust gas after-treatment device of an internal combustion engine, downstream of a catalytic converter arrangement, wherein the method comprises the steps:
   measuring, by a first sensor, a nitrogen oxide content in the exhaust gas upstream of the ammonia slip catalytic converter, wherein the first sensor is positioned upstream of the catalytic converter arrangement and is configured to detect the nitrogen oxide content in the exhaust gas prior to the catalytic converter arrangement,
   detecting, by a controller, a sensor signal of an ammonia-cross-sensitive nitrogen oxide sensor arranged downstream of the ammoma slip catalytic converter,
   checking, by the controller, whether the ammonia-cross-sensitive nitrogen oxide sensor measures a value higher than the nitrogen oxide content in the exhaust gas measured by the first sensor,
   determining, by the controller, an operating condition of the ammonia slip catalytic converter based on whether the ammonia-cross-sensitive nitrogen oxide sensor measured the value higher than the first sensor, and
   outputting, by the controller, the operating condition of the ammonia slip catalytic converter as to whether the ammonia slip catalytic converter is functionally capable or defective.

2. The method for monitoring an ammoma slip catalytic converter according to claim 1, wherein the checking step takes place during an overrun operating phase during which an NOx raw emission is zero.

3. The method for monitoring an ammoma slip catalytic converter according to claim 1, wherein the checking step takes place during an overrun operating phase during which a fuel injection rate is zero.

4. The method for monitoring an ammoma slip catalytic converter according to claim 1, wherein the checking step takes place during an overrun operating phase during which a current ammonia loading of the catalytic converter arrangement is greater than the necessary ammonia loading.

5. A system for an exhaust gas after-treatment device comprising:
   a controller,
   a catalytic converter arrangement having a diesel oxidation catalytic converter, a SCR-coated particle filter and a SCR catalytic converter,
   an ammonia slip catalytic converter arranged downstream of the catalytic converter arrangement,
   a first sensor configured to measure a nitrogen oxide content in the exhaust gas an upstream of the catalytic converter arrangement,
   at least one ammonia injector arranged upstream of the ammonia slip catalytic converter, and
   an ammonia cross-sensitive nitrogen oxide sensor arranged downstream of the ammonia slip catalytic converter,
   wherein the controller is configured to determine whether the ammonia-cross-sensitive nitrogen oxide sensor measures a value higher than the nitrogen oxide content in the exhaust gas measured by the first sensor, to determine an operating condition of the ammonia slip catalytic converter based on whether the ammonia-cross-sensitive nitrogen oxide sensor measured the value higher than the first sensor, and outputting the operating condition of the ammonia slip catalytic converter as to whether the ammonia slip catalytic converter is functionally capable or defective.

* * * * *